(12) United States Patent
Izcara Zurro et al.

(10) Patent No.: US 10,607,748 B2
(45) Date of Patent: Mar. 31, 2020

(54) ELECTRICAL INSULATION SYSTEM FOR MEDIUM- AND HIGH-VOLTAGE ELECTRICAL SWITCHGEAR

(71) Applicant: Ormazabal Corporate Technology, A.I.E., Amorebieta-Etxano (ES)

(72) Inventors: Jesus Izcara Zurro, Amorebieta-Etxano (ES); Javier Larrieta Zubia, Amorebieta-Etxano (ES)

(73) Assignee: Ormazabal Corporate Technology, A.I.E., Amorebieta-Etxano (ES)

( * ) Notice: Subject to any disclaimer, the term of this patent is extended or adjusted under 35 U.S.C. 154(b) by 351 days.

(21) Appl. No.: 15/544,208

(22) PCT Filed: Jan. 20, 2015

(86) PCT No.: PCT/ES2015/070030
§ 371 (c)(1),
(2) Date: Oct. 20, 2017

(87) PCT Pub. No.: WO2016/116637
PCT Pub. Date: Jul. 28, 2016

(65) Prior Publication Data
US 2018/0315520 A1 Nov. 1, 2018

(51) Int. Cl.
*H01B 3/20* (2006.01)
*C09K 3/00* (2006.01)
(Continued)

(52) U.S. Cl.
CPC .............. *H01B 3/20* (2013.01); *C09K 3/00* (2013.01); *H01B 3/002* (2013.01); *H01B 3/56* (2013.01);
(Continued)

(58) Field of Classification Search
CPC ... H01B 3/20; H01B 3/18; H01B 3/00; H01B 3/008; H01B 3/56; H01B 3/16;
(Continued)

(56) References Cited

U.S. PATENT DOCUMENTS

| | | | |
|---|---|---|---|
| 6,228,917 B1 * | 5/2001 | Keogh | C08K 5/0025 524/333 |
| 8,680,421 B2 * | 3/2014 | Hyrenbach | H01B 3/56 218/158 |

(Continued)

FOREIGN PATENT DOCUMENTS

| | | |
|---|---|---|
| WO | WO-2010142346 A1 | 12/2010 |
| WO | WO-2010146022 A1 | 12/2010 |

(Continued)

OTHER PUBLICATIONS

Baldé, Kaisa, International Search Report, prepared for PCT/ES2015/070030, dated Nov. 12, 2015, four pages.

*Primary Examiner* — Angel R Estrada
(74) *Attorney, Agent, or Firm* — Winstead PC (57) ABSTRACT

The present invention relates to an electrical insulation system having a low environmental impact comprising two fundamental elements: a) a gaseous medium formed by one or more highly fluorinated fluoroketones having between 4 and 12 carbons, at least another additional dielectric gas, other than the fluoroketones, with a vapor pressure greater than 500 mbar and less than 15000 mbar at 0° C., such as fluoronitrile $(CF_3)_2CF-CN$, for example, and one or more vector gases; and b) a molecular sieve capable of discriminating water molecules from molecules of other gases present in the gaseous medium of the system. The invention also relates to the use of the insulation system and to the medium- or high-voltage electrical switchgear comprising a complete enclosure in which there are arranged live electri- (Continued)

cal components and an electrical insulation system according to the invention.

13 Claims, 3 Drawing Sheets

(51) Int. Cl.
    *H01H 33/22*     (2006.01)
    *H01B 3/56*     (2006.01)
    *H01B 3/00*     (2006.01)
    *H01H 33/56*     (2006.01)
    *H02B 13/055*     (2006.01)

(52) U.S. Cl.
    CPC ............ *H01H 33/22* (2013.01); *H01H 33/56* (2013.01); *H01H 2033/566* (2013.01); *H02B 13/055* (2013.01)

(58) Field of Classification Search
    CPC .............. C09K 3/00; C09K 2003/1034; H02B 13/055; H02B 13/00; H01H 33/22
    USPC .......... 174/80, 137 R, 138 R, 140 R, 137 B, 174/17 GF, 120 R
    See application file for complete search history.

(56) References Cited

U.S. PATENT DOCUMENTS

| | | | | |
|---|---|---|---|---|
| 8,866,016 | B2 * | 10/2014 | Smedberg | B32B 27/32 |
| | | | | 174/120 R |
| 8,956,556 | B2 * | 2/2015 | Breay | B64D 37/32 |
| | | | | 174/137 R |
| 9,245,666 | B2 * | 1/2016 | Dorfman | C08K 3/08 |
| 9,510,493 | B2 * | 11/2016 | Kieffel | H01H 33/22 |
| 9,587,043 | B2 * | 3/2017 | Nilsson | C08F 10/02 |

FOREIGN PATENT DOCUMENTS

| | | |
|---|---|---|
| WO | WO-2012160155 A1 | 11/2012 |
| WO | WO-2012160158 A1 | 11/2012 |
| WO | WO-2013151741 A1 | 10/2013 |
| WO | WO-2014053661 A1 | 4/2014 |
| WO | WO-2014173776 A1 | 10/2014 |
| WO | WO-2015071303 A1 | 5/2015 |

\* cited by examiner

ELECTRICAL INSULATION SYSTEM FOR MEDIUM- AND HIGH-VOLTAGE ELECTRICAL SWITCHGEAR

FIELD OF THE INVENTION

The present invention is comprised in the field of electrical insulation systems for use in medium- and high-voltage electrical switchgear. More particularly, the invention relates to an electrical insulation system comprising two fundamental elements: a) a gaseous medium formed by one or more highly fluorinated fluoroketones having between 4 and 12 carbons, at least another additional dielectric gas, other than the fluoroketones, with a vapor pressure greater than 500 mbar and less than 15000 mbar at 0° C., and one or more vector gases; and b) a molecular sieve capable of adsorbing preferably the water molecules versus the molecules of the vector gases present in the gaseous medium of the system. The invention also relates to the use of the electrical insulation system and to the medium- or high-voltage electrical switchgear comprising a complete enclosure in which there are arranged live electrical components and an electrical insulation system according to the invention.

BACKGROUND OF THE INVENTION

Electrical insulation in medium- and high-voltage equipment is usually assured by means of using a dielectric gas which is introduced in a leak-tight complete enclosure in which live components of the electric equipment are arranged.

The most widely used dielectric gas in recent years has been $SF_6$ because of its excellent dielectric properties and, among many other additional advantages, because it is not toxic for humans. However, this gas has an enormous environmental impact due to its high global warming potential (GWP=22800).

For this reason, alternatives that can replace this gas in such equipment have been sought in recent years. Different gases with good dielectric properties have been considered as an alternative to $SF_6$ but for one reason or another (unacceptable toxicity, high global warming potential, etc.), they ultimately have not been implemented.

Likewise, the use of only more environmentally friendly gases such as dry air, $N_2$, $O_2$ or $CO_2$ as dielectric medium in this equipment would entail a considerable increase in the size of such equipment for a given voltage level due to the lower dielectric strength of these gases with respect to $SF_6$. Another option in this case would be to increase the equipment filling pressure to values exceeding those used with $SF_6$ (around 1300 mbar), but this would involve conditioning design to fulfilling the various national regulations in force for vessels with pressures exceeding 1500 mbar, with the subsequent equipment cost increase.

A promising alternative are fluoroketones not only because they have good dielectric strength but also because some of them are not toxic for humans and have an environmental impact that is far inferior to that of $SF_6$ gas. In fact, patent documents WO2010/146022 or WO2010142346 describes the use of fluoroketones for electrical insulation in medium- and high-voltage apparatus. Other patent documents, such as WO2012160158 and WO2012160155, describe mixtures of fluoroketones with vector gases such as $CO_2$, $N_2$, $O_2$, air or mixtures thereof.

Another promising alternative are fluorinated nitriles, or fluoronitriles, which also have good dielectric strength. Patent document WO2013/151741 describes the use of two fluoronitriles as a dielectric fluid in electrical equipment.

Another problem negatively affecting the dielectric capacity of gaseous insulation systems is the presence of water molecules from materials used to manufacture some electrical components of the switchgear itself. Water can appear in the leak-tight complete enclosure of the switchgear in which the insulating gas is located because some thermoplastic materials used in manufacturing electrical components, such as polyamides, for example, may contain water therein. For example, in the case of polyamides, they can have between 4.5 and 7.5% by weight of water absorbed therein.

The presence of water in the gaseous medium lessens the dielectric properties thereof, so the presence thereof must be avoided.

Drying agents as well as molecular sieves have been used to solve the problem of water present in electric switchgear. A molecular sieve is a material containing small, precisely- and uniformly-sized pores and it is used as an adsorbent agent for gases and liquids. Molecules that are small enough to go through the pores are adsorbed, whereas larger molecules are not. Unlike a filter, the process works on a molecular level. For example, a water molecule may be small enough to go through same, whereas other larger molecules cannot.

In insulation systems with $SF_6$ gas as the only insulating gas, separation of water is relatively simple by means of molecular sieves because the size of the $SF_6$ molecule is substantially larger than the size of a water molecule, and therefore selection by molecule sizes does not pose a significant problem. However, this problem is not so easy to solve in gaseous insulation systems in which there are molecules with sizes comparable to the size of a water molecule, such as, for example, vector gases such as $N_2$, $CO_2$, dry air together with insulating agents as fluoroketones or fluoronitriles. In such dielectric insulating agents, the gases acting as vectors ($CO_2$, $N_2$, air, $O_2$, etc.) have molecular sizes similar to that of a water molecule and the sieves can adsorb part of these gases instead of the water molecules.

Therefore, there is a need to develop gaseous dielectric insulation systems for medium- and high-voltage switchgear having a suitable dielectric strength (similar to that of $SF_6$), which are not toxic for humans, which have minimal environmental impact and an insulation capacity that is not affected by the possible water that may appear inside the complete enclosures of said electrical switchgear, in which electrical components insulated with dielectric gases are arranged.

OBJECT OF THE INVENTION

Therefore, one object of the invention is an electrical insulation system having a low environmental impact for medium- or high-voltage electrical switchgear, representing a solution to the aforementioned problems. More particularly, the main object of the present invention is an electrical insulation system for medium- or high-voltage electrical switchgear comprising:

a) a gaseous medium comprising a mixture of one or more highly fluorinated fluoroketones having between 4 and 12 carbons, at least another additional dielectric gas, other than the fluoroketones, with a vapor pressure greater than 500 mbar and less than 15000 mbar at 0° C., and one or more vector gases, and b) a molecular sieve with a pore size of 3 to 6 Å and a polar surface.

Another object of the invention is the use of the electrical insulation system of the invention for electrical insulation and/or for quenching electric arcs in medium- or high-voltage electrical switchgear.

An additional object of the invention is a method for electrical insulation and/or for quenching electric arcs in medium- and high-voltage electrical switchgear comprising introducing the electrical insulation system in a leak-tight complete enclosure in which live electrical components of said medium- or high-voltage electrical switchgear are arranged.

A final object of the present invention is a medium- or high-voltage electrical switchgear comprising a complete enclosure in which there are arranged live electrical components and an electrical insulation system according to the present invention.

DETAILED DESCRIPTION OF THE INVENTION

A first object of the invention relates to an electrical insulation system for medium- or high-voltage electrical switchgear comprising:
a) a gaseous medium comprising a mixture of:
  one or more fluoroketones having between 4 and 12 carbons
  at least another additional dielectric gas, other than the fluoroketones, with a vapor pressure greater than 500 mbar and less than 15000 mbar at 0° C.
  one or more vector gases, and
b) a molecular sieve with a pore size of 3 to 6 Å and a polar surface.

The first element of the electrical insulation system of the invention is the gaseous medium. Within this gaseous medium, one of the essential elements is fluoroketones having between 4 and 12 carbons which, according to the present invention, have general formula (I):

$$R_1\text{—CO—}R_2 \qquad (I)$$

where $R_1$ and $R_2$ represent at least partially fluorinated linear or branched carbon chains having between 1 and 10 carbons. The definition of formula (I) includes both perfluorinated ketones and hydrofluorinated ketones.

More particularly, the fluoroketones can have between 4 and 10 carbons, and even more particularly between 4 and 8 carbons.

In a particular preferred embodiment of the invention, the fluoroketones have 5 or 6 carbons, and in a more particular and preferred manner, the fluoroketones have structural formulas $CF_3\text{—CO—CF—}(CF_3)_2$ (referred to as C5K) and $CF_3\text{—CF}_2\text{—CO—CF—}(CF_3)_2$ (referred to as C6K), respectively. The reason for which these two fluoroketones are particularly preferred is because they are products with good dielectric strength, very low global warming potential (GWP=1), and furthermore they are not toxic. For example, for fluoroketone C5K the threshold limit value for daily exposure, TLV-DE (8 hours), is 225 ppmv.

The second essential element of the gaseous medium is the additional dielectric gas, other than the fluoroketones, with a vapor pressure greater than 500 mbar and less than 15000 mbar at 0° C., such as fluoronitrile, for example. The authors of the present invention have found that incorporating the additional dielectric gas with a vapor pressure greater than 0.5 bar and less than 15 bar at 0° C., such as fluoronitrile, for example, in a fluoroketone-based insulation system provides a significant increase in dielectric strength of the gaseous mixture without negatively affecting other operating parameters.

In a particular preferred embodiment of the invention, the additional dielectric gas is a fluoronitrile and more preferably heptafluoroisobutyronitrile, the chemical formula of which is $(CF_3)_2\text{—CF—CN}$ and having a low environmental impact (GWP value close to 10% of the $SF_6$ value) and very good dielectric properties.

The other element of the gaseous mixture of the electrical insulation system of the invention is the vector gas or gases. Gases used to dilute the fluoroketone or fluoroketones and the additional dielectric gas are known as vector gases, and even though they have a lower dielectric strength they allow the gaseous medium to behave as such at low temperatures. On the other hand, they are usually completely harmless (non-toxic) gases generally having a low environmental impact.

In a particular embodiment, the vector gases are selected from $N_2$, $CO_2$, $O_2$, dry air, helium or mixtures thereof.

A particular preferred embodiment of the invention relates to an electrical insulation system in which the gaseous mixture comprises a fluoroketone having 4 to 12 carbons, preferably 5 or 6 carbons, more preferably fluoroketone C5K, a fluoronitrile, preferably heptafluoroisobutyronitrile, and one or more vector gases. In this embodiment, the vector gases are preferably selected from $N_2$, $CO_2$, $O_2$, dry air, helium or mixtures thereof.

Another particular preferred embodiment of the invention relates to an electrical insulation system in which the gaseous mixture comprises two fluoroketones having 4 to 12 carbons, preferably 5 or 6 carbons, more preferably fluoroketones C5K and C6K, a fluoronitrile, preferably heptafluoroisobutyronitrile, and one or more vector gases. In this embodiment, the vector gases are preferably selected from $N_2$, $CO_2$, $O_2$, dry air, helium or mixtures thereof.

The total dielectric strength of the gaseous mixture will be affected by the amount of fluoroketone or fluoroketones and additional dielectric gas (such as fluoronitrile, for example), such that the more fluoroketone and additional dielectric gas there are in the gaseous mixture, the greater the dielectric strength thereof.

However, the amount of fluoroketone and additional dielectric gas in the gaseous mixture is determined by the minimal operating temperature of the switchgear wherever it is going to be used. Generally, the lower the minimal operating temperature of the electrical switchgear the smaller the amount of fluoroketones and additional dielectric gas can be introduced in the gaseous mixture because it is desirable to prevent the partial condensation thereof at low temperatures.

The other fundamental element of the electrical insulation system of the invention, besides the gaseous medium, is a molecular sieve with a pore size of 3 to 6 Å and a polar surface.

A molecular sieve such as the one described above is a material containing small, precisely- and uniformly-sized pores used as an adsorbent for gases and liquids. Molecular sieves are capable of discriminating at the molecular size level, such that the molecules that are small enough to go through the pores are adsorbed, whereas larger molecules are not.

The use of the molecular sieve in the electrical insulation system of the invention is justified by the need to adsorb water molecules present in the materials of some components forming the electrical switchgear because the presence of said molecules negatively affects dielectric strength, and therefore the capacity of the gaseous mixture with fluoroketones and fluoronitrile as an insulating agent.

Molecular sieves have enormous water adsorption capacity which in some cases can reach up to 22% its weight in water. Nevertheless, since the molecules of the vector gases ($N_2$, $CO_2$, $O_2$, dry air or helium) of the gaseous mixture of the insulation system have a molecular size similar to that of a water molecule, the molecular sieve must have the capacity to selectively separate water molecules from the molecules of these gases.

To that end, the inventors have found that using a molecular sieve with a pore size of 3 to 6 Å and a polar surface allows performing this discrimination and selectively adsorbing water molecules versus $N_2$, $CO_2$, $O_2$, dry air or helium molecules, meaning that the dielectric strength of the electrical insulation system of the invention is neither altered nor deteriorated.

This selective capacity for water of the sieves of the electrical insulation system of the invention results not only from pore size but also, and particularly for the case of molecules having a size similar to the size of water molecules, from the polar surface of the molecular sieves. The fact that the surface is polar means that it will more strongly attract more polar molecules preferably over the least polar molecules.

Table 1 describes both size and polarity of certain molecules:

TABLE 1

| Product | Size of the molecule, angstroms | polarity |
|---|---|---|
| Helium | 2.551 | 10.2 |
| Air | 3.711 | 78.6 |
| Carbon dioxide ($CO_2$) | 3.941 | 195.2 |
| Water ($H_2O$) | 2.641 | 809.1 |
| Nitrogen ($N_2$) | 3.798 | 71.4 |
| Oxygen ($O_2$) | 3.467 | 106.7 |
| Sulfur hexafluoride ($SF_6$) | 5.128 | 222.1 |
| Fluoroketone C5K | about 9.000 | |

Based on this data it is easy to understand, for example, that it will be easy to discriminate by size adsorption of water molecules versus $SF_6$ or fluoroketone molecules, for example, but this is not the case versus vector gas molecules, such as helium, $O_2$, $N_2$, $CO_2$ or air molecules, the sizes of which are similar to one another. Much higher polarity of the water than that of the other vector gases is relevant with respect to these molecules. This characteristic of water molecules is what makes them preferably be adsorbed compared to the rest when the surface of the sieve is polar.

There are molecular sieves of a different nature, such as zeolites, which include aluminosilicates, porous glasses, clays, microporous carbons, activated carbons, etc. In principle, any molecular sieve is suitable for use in the electrical insulation system of the invention provided that it complies with the pore size being between 3 and 6 Å and having a polar surface.

Nevertheless, in a preferred embodiment of the invention the molecular sieve has a pore size of 3 to 4 Å.

Also in a preferred embodiment, the molecular sieve is a zeolite sieve. The zeolite can be natural zeolite, and preferably synthetic zeolite. Zeolites are aluminosilicates that can have different structures, such as zeolite A, zeolite X, zeolite Y, etc.

In the preferred embodiment of the invention, the zeolite has structure A. The structure of zeolite A can be seen in FIG. 1. The aluminum, silicon and oxygen atoms associate with one another to form truncated octahedrons called sodalite cages. The sodalite cages are combined in zeolite A in the form of a simple cube, leaving an inner space called a cage with a cavity that is 11.5 Å in diameter and accessible from the openings of the six sides of the cube. These inlets are surrounded by 8 oxygen atoms and one or more interchangeable cations partially block the front area. When the cations are sodium cations ($Na^+$) (see FIG. 2), the ring of oxygen atoms provides a "window" that is 4.2 Å in diameter for entering the interior of the structure (a cage). The sodium cations can be partially substituted with other cations in synthetic zeolites, such as with potassium cations ($K^+$) or calcium cations ($Ca^{2+}$), for example, giving rise to openings that are 3 Å and 5 Å, respectively.

Figure 1:
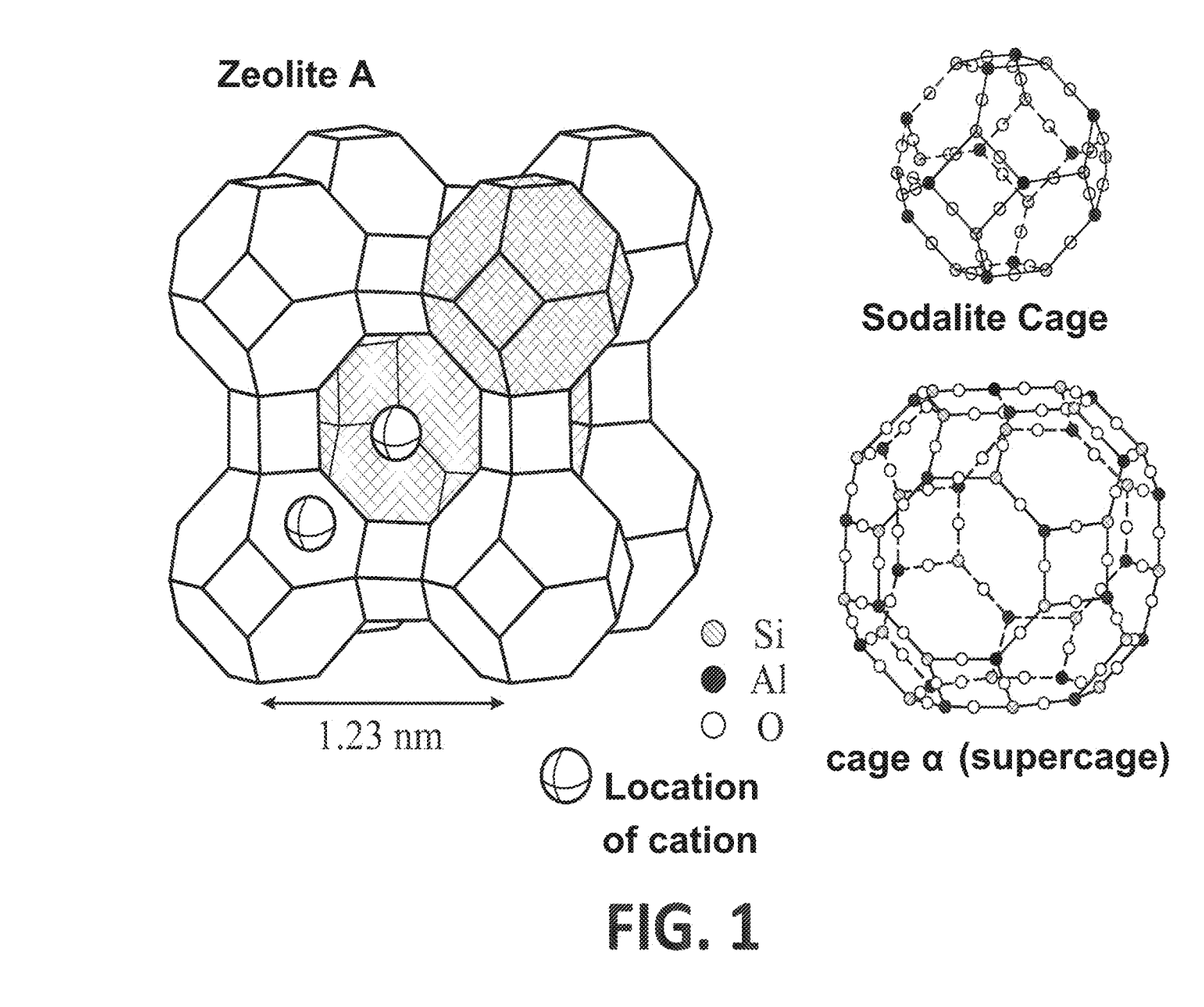
FIG. 1 shows a depiction of the zeolite A structure.
Figure 2:
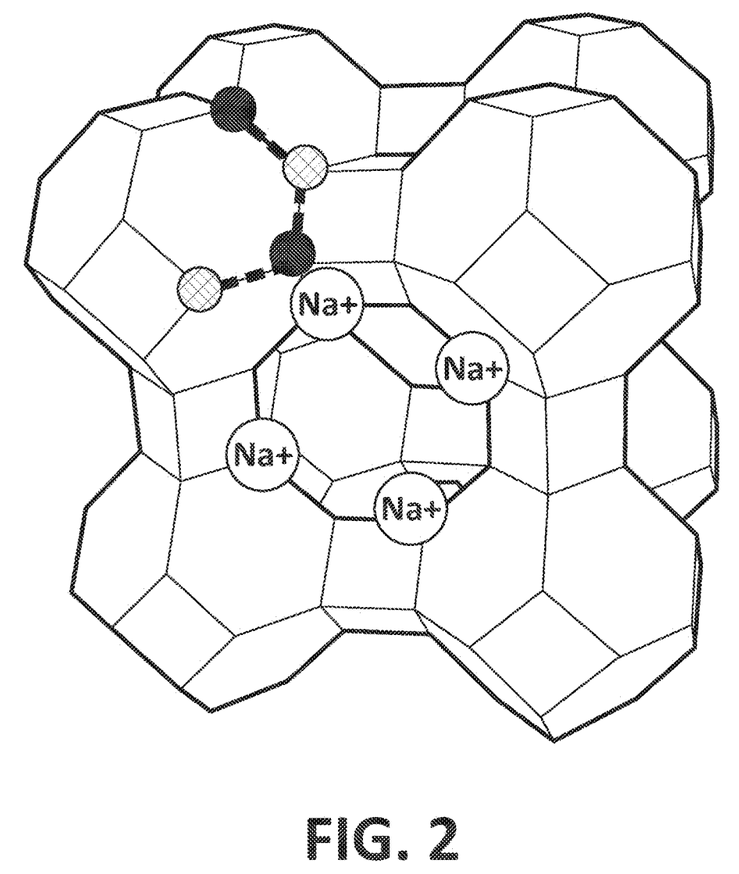
FIG. 2 shows a depiction of the location of the sodium cations in the zeolite A structure.

In addition to contributing to determining the pore opening diameter, which is unarguably relevant in the molecular discrimination of gases adsorbed by zeolites, they contribute to the existence in the crystalline structure of the zeolite rigidly established positive and negative charges resulting in an uneven distribution of charges, which makes the surface polar. This characteristic of zeolite is precisely what allows preferably adsorbing water molecules versus other vector gas molecules, such as $N_2$, $CO_2$, $O_2$, dry air or helium molecules.

Another additional object of the invention is represented by the use of an electrical insulation system like the one described above for electrical insulation and/or for quenching electric arcs in medium- or high-voltage electrical switchgear.

The gaseous medium comprising a mixture of one or more fluoroketones having between 4 and 12 carbons, an additional dielectric gas with a vapor pressure greater than 500 mbar and less than 15000 mbar at 0° C. (for example, a fluoronitrile) and one or more vector gases, provides a dielectric strength to the system which the molecular sieve with a pore size of 3 to 6 Å and a polar surface is responsible for maintaining because it is capable of selectively adsorbing water molecules that can appear in the gaseous medium from some of the elements of the medium- and high-voltage electrical switchgear that are arranged in the leak-tight complete enclosure of said switchgear. Therefore, the system of the invention is extremely useful in electrical insulation and is capable of quenching electric arcs in such electrical switchgear.

Another additional object of the invention somehow related to the use of the electrical insulation system of the invention relates to a method for electrical insulation and/or for quenching electric arcs in high- and medium-voltage electrical switchgear comprising introducing an electrical insulation system comprising:

a) a gaseous medium comprising a mixture of
  one or more highly fluorinated fluoroketones having between 4 and 12 carbons at least one additional dielectric gas with a vapor pressure greater than 500 mbar and less than 15000 mbar at 0° C. (for example, a fluoronitrile)

and one or more vector gases, and b) a molecular sieve with a pore size of 3 to 6 Å and a polar surface, in a leak-tight complete enclosure in which the elements of said medium- or high-voltage electrical switchgear to be insulated are arranged.

To that end, one or more gas-permeable bags containing the molecular sieve are initially placed inside the enclosure. The enclosure is then closed such that it is perfectly leak-tight, and a vacuum is applied. The gaseous mixture with the fluoroketone or fluoroketones, the additional dielectric gas and the vector gas or gases is then introduced until reaching the desired pressure.

A final object of the invention relates to medium- or high-voltage electrical switchgear comprising a complete enclosure in which there are arranged live electrical components and an electrical insulation system comprising:

a) a gaseous medium comprising a mixture of
one or more highly fluorinated fluoroketones having between 4 and 12 carbons
at least one additional dielectric gas with a vapor pressure greater than 500 mbar and less than 15000 mbar at 0° C. (for example, a fluoronitrile)
one or more vector gases, and b) a molecular sieve with a pore size of 3 to 6 Å and a polar surface.

Figure 3:
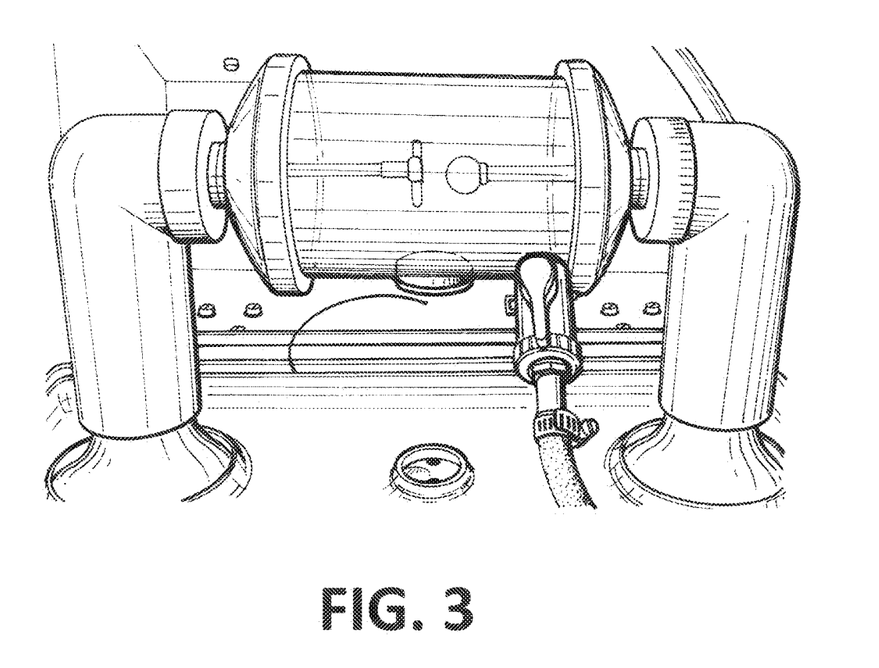
FIG. 3 shows the BAUR DTA-100E equipment used to determine the dielectric strength of gaseous electrical insulation systems.

FIG. 3 shows a testing system for experimentally determining the dielectric strength of gaseous insulation systems.

In a particular embodiment of the invention, said switchgear can be secondary distribution switchgear for power distribution grids of up to 72 kV.

Examples which allow understanding the possible embodiments of the invention are provided below.

Example 1: Detailed Description of the Embodiments of the Invention

An electrical insulation system inside a leak-tight complete enclosure that is part of medium- or high-voltage electrical switchgear is proposed as the preferred embodiment of this invention, said system comprising a zeolite molecular sieve with a size between 3 and 6 Å, preferably between 3 Å and 4 Å, and furthermore a gaseous mixture comprising:

a) a completely fluorinated fluoroketone with structural formula $CF_3$—CO—CF—$(CF_3)_2$ (called C5K) and
b) optionally also another completely fluorinated fluoroketone with structural formula $CF_3$—$CF_2$—CO—CF—$(CF_3)_2$ (called C6K),
c) at least another additional dielectric gas, other than the fluoroketones, with a vapor pressure greater than 500 mbar and less than 15000 mbar at 0° C., such as a fluoronitrile, for example, particularly heptafluoroisobutyronitrile with chemical formula $(CF_3)_2$—CF—CN,
d) and in addition to another vector gas or gases, such as $N_2$, $CO_2$, dry air, $O_2$ or helium, for example, or any combination thereof.

The two mentioned fluoroketones are products with good dielectric strength, a very low global warming potential (GWP=1), and furthermore they are not toxic. For example, the threshold limit value for daily exposure, TLV-DE (8 hours), for fluoroketone C5K is 225 ppmv.

The presence in the gaseous mixture of another additional dielectric gas such as fluoronitrile, for example, with chemical formula $(CF_3)_2$—CF—CN, allows substantially increasing dielectric strength of the mixture without negatively affecting other operating parameters.

In addition to the dielectric strength of the insulation system being improved by the presence of the selective molecular sieve used due to the reduction of water therein, it will also be affected by the percentage of fluoroketone or fluoroketones and of the other additional dielectric gas (such as fluoronitrile, for example) used in the gaseous mixture. Therefore, the more fluoroketone and additional dielectric gas in the gaseous mixture, the greater the dielectric strength thereof, for a certain final filling pressure. However, as mentioned above, the amount of fluoroketone and additional dielectric gas in the gaseous mixture is determined by the minimal operating temperature of the switchgear if condensation thereof at low temperatures is to be avoided (which would lead to a reduction of dielectric properties of the gaseous mixture at those low temperatures).

The two tables below show the molar fraction values for fluoroketones C5K and C6K and for heptafluoroisobutyronitrile (FN) which could be used in the gaseous mixture without causing condensation thereof for different minimal operating temperatures of the switchgear, assuming a switchgear filling temperature of 20° C. and a total mixture filling pressure of 1400 mbar.

TABLE 2

Mixtures with fluoroketone C5K

| Temp (° C.) | Pvs, C5K (bar) | P, C5K (bar) | X, C5K |
|---|---|---|---|
| −40 | 0.062 | 0.078 | 0.0557 |
| −35 | 0.082 | 0.101 | 0.0721 |
| −30 | 0.106 | 0.128 | 0.0913 |
| −25 | 0.136 | 0.161 | 0.1148 |
| −20 | 0.173 | 0.200 | 0.1431 |
| −15 | 0.217 | 0.246 | 0.1760 |
| −10 | 0.271 | 0.302 | 0.2156 |
| −5 | 0.336 | 0.367 | 0.2624 |
| 0 | 0.413 | 0.443 | 0.3166 |

TABLE 3

Mixtures with fluoroketone C6K

| Temp. (° C.) | Pvs, C6K (bar) | P, C6K (bar) | X, C6K |
|---|---|---|---|
| −40 | 0.015 | 0.018 | 0.0131 |
| −35 | 0.020 | 0.025 | 0.0177 |
| −30 | 0.027 | 0.033 | 0.0235 |
| −25 | 0.037 | 0.043 | 0.0309 |
| −20 | 0.049 | 0.056 | 0.0401 |
| −15 | 0.064 | 0.072 | 0.0516 |
| −10 | 0.083 | 0.092 | 0.0657 |
| −5 | 0.106 | 0.116 | 0.0829 |
| 0 | 0.135 | 0.145 | 0.1037 |

TABLE 4

Mixtures with heptafluoroisobutyronitrile (FN)

| Temp. (° C.) | Pvs, FN (bar) | P, FN (bar) | X, FN |
|---|---|---|---|
| −40 | 0.1730 | 0.218 | 0.1554 |
| −35 | 0.2320 | 0.286 | 0.2040 |
| −30 | 0.3050 | 0.368 | 0.2627 |
| −25 | 0.3950 | 0.467 | 0.3333 |
| −20 | 0.5040 | 0.584 | 0.4169 |
| −15 | 0.6340 | 0.720 | 0.5143 |
| −10 | 0.7880 | 0.878 | 0.6270 |

TABLE 4-continued

Mixtures with heptafluoroisobutyronitrile (FN)

| Temp. (° C.) | Pvs, FN (bar) | P, FN (bar) | X, FN |
|---|---|---|---|
| −5 | 0.9680 | 1.058 | 0.7559 |
| 0 | 1.1770 | 1.263 | 0.9023 | where:
Pvs,C5k and Pvs,C6K and Pvs,FN are the saturation vapor pressures of fluoroketones C5K and C6K and of heptafluoroisobutyronitrile at different temperature values,
P,C5K and P,C6K and P,FN are the pressure values for fluoroketones and heptafluoroisobutyronitrile in the switchgear at the filling temperature of 20° C. (P,C5K=Pvs,C5K× 293.15/Tmin(K))
X,C5K and X,C6K and X,FN are the molar fractions for fluoroketones and heptafluoroisobutyronitrile in the final mixture (for a final filling pressure of 1400 mbar) which could be used without condensation thereof occurring, even at the minimal operating temperature of the switchgear.

For example, the following could be used for medium-voltage switchgear with a filling pressure of 1.40 bar at 20° C. and minimal operating temperature of −15° C.:
a) a mixture of $N_2$ (or $CO_2$, or dry air or $O_2$ or helium or a mixture thereof) with 17.60% C5K,
b) or a mixture of $N_2$ (or $CO_2$, or dry air or $O_2$ or helium or a mixture thereof) with 5.16% C6K,
c) or a mixture of $N_2$ (or $CO_2$, or dry air or $O_2$ or helium or a mixture thereof) with 51.43% FN,
d) or a mixture of $N_2$ (or $CO_2$, or dry air or $O_2$ or helium or a mixture thereof) with 17.60% C5K, 5.16% C6K and 51.43% FN
without condensation of the fluoroketones or heptafluoroisobutyronitrile occurring until −15° C.

Below that temperature of −15° C., fluoroketones and heptafluoroisobutyronitrile would start to partially condense, the percentage thereof in the gaseous mixture being reduced, the dielectric strength of the initial insulation system therefore dropping.

In the same manner, the following could be used for medium-voltage switchgear with a filling pressure of 1.40 bar at 20° C. and minimal operating temperature of −25° C.:
a) a mixture of $N_2$ (or $CO_2$, or dry air or $O_2$ or helium or a mixture thereof) with 11.48% C5K
b) or a mixture of $N_2$ (or $CO_2$, or dry air or Oz or helium or a mixture thereof) with 3.09% C6K,
c) or a mixture of $N_2$ (or $CO_2$, or dry air or $O_2$ or helium or a mixture thereof) with 33.33% FN,
d) or a mixture of $N_2$ (or $CO_2$, or dry air or $O_2$ or helium or a mixture thereof) with 11.48% C5K, 3.09% C6K, and 33.33% FN
without condensation of the fluoroketones or heptafluoroisobutyronitrile occurring until −25° C.

Below that temperature of −25° C., fluoroketones and heptafluoroisobutyronitrile would start to partially condense, the percentage thereof in the gaseous mixture being reduced, the dielectric strength of the initial insulation system therefore dropping.

This occurs successively for other minimal operating temperatures of the switchgear.

If final pressures of the mixture in the switchgear were different from 1.40 bar, the percentages of C5K and C6K and heptafluoroisobutyronitrile would also be modified accordingly and in accordance with the following formula:

$X,C5K=P,C5K/P$total mixture $X,C6K=P,C6K/P$total mixture $X,FN=P,FN/P$total mixture Ptotal mixture being the final pressure of the mixture.

If percentages of fluoroketones and fluoronitrile that are higher than what is indicated for each temperature were used in the mixtures when filling the switchgear, the dielectric strength will obviously be greater, but it would have to be taken into account that at minimal operating temperatures, dielectric strength of the insulation system would drop and be less than if the percentages of fluoroketone and fluoronitrile indicated in Tables 1, 2 and 3 had been used for each temperature due to condensation of part of the fluoroketone or fluoroketones and/or fluoronitrile.

Example 2: Gaseous Mixture Dielectric Strength Test

The dielectric strength of different gaseous mixtures was evaluated by measuring the "dielectric breakdown voltage" in BAUR DTA-100E equipment provided with a cell for testing gases with two electrodes according to ASTM standard 02477 (one of the electrodes is a disk with a flat face measuring 1.50 inches in diameter and the other electrode is a spherical ball measuring 0.75 inches in diameter) and with a distance of 8 mm between electrodes.

The tested gaseous mixtures were:
a) 1400 mbar of $CO_2$
b) 1400 mbar of mixture $CO_2$+9% C5K
c) 1400 mbar of mixture $CO_2$+9% C5K+8% FN The results of these tests are shown in Table 5.

TABLE 5

Dielectric breakdown voltage values of the gaseous mixtures

| GAS or MIXTURE | Dielectric breakdown voltage, kV |
|---|---|
| $CO_2$ | 20.1 |
| $CO_2$ + 9% C5K | 35.8 |
| $CO_2$ + 9% C5K + 8% FN | 47.3 |

As can be seen in the table, the addition of 8% heptafluoroisobutyronitrile to the mixture of fluoroketone with $CO_2$ provides an increase in the dielectric breakdown voltage of said mixture of around 25%, which means that a gaseous mixture having these characteristics is even more suitable for electrical insulation applications in medium- or high-voltage electrical switchgear.

Example 3: Environmental Impact (Global Warming) of a Gaseous Mixture Example

As indicated in the European Regulation on fluorinated greenhouse gases, the global warming potential (GWP) of a gaseous mixture is calculated as the weighted mean derived from the sum of fractions by weight of each of the substances multiplied by its GWP value.

Therefore, the global warming potential (GWP) of a mixture with 9% fluoroketone C5K, 8% heptafluoroisobutyronitrile and 83% $CO_2$ would be about 454, i.e., 2% of the global warming potential (GWP) of $SF_6$ gas (taking into account that the GWP of C5K is 1 and the GWP of heptafluoroisobutyronitrile is 2210, and that the molecular weight of C5K is 266, the molecular weight of heptafluoroisobutyronitrile is 195 and the molecular weight of $CO_2$ is 44).

The invention claimed is:

1. An electrical insulation system for medium- or high-voltage electrical switchgear having a low environmental impact, the electrical insulation system comprising:
   a) a gaseous medium not containing $CO_2$, the gaseous medium comprising a mixture of:
      one or more fluoroketones having between 4 and 12 carbons;
      at least another additional dielectric gas, other than the fluoroketones, with a vapor pressure greater than 500 mbar and less than 15000 mbar at 0° C.; and
      one or more vector gases selected from $N_2$, $O_2$, dry air, helium or mixtures thereof; and
   b) a molecular sieve with a pore size of 3 to 4 Å and a polar surface.

2. The electrical insulation system according to claim 1, where the gaseous medium comprises a fluoroketone having 4 to 12 carbons, a fluoronitrile with a vapor pressure greater than 500 mbar and less than 15000 mbar at 0° C. as the additional dielectric gas, and one or more vector gases.

3. The electrical insulation system according to claim 2, where the gaseous medium comprises a fluoroketone having 5 or 6 carbons, a fluoronitrile with a vapor pressure greater than 500 mbar and less than 15000 mbar at 0° C. as the additional dielectric gas, and one or more vector gases.

4. The electrical insulation system according to claim 3, where the fluoroketone is $(CF_3)_2$—CF—CO—$CF_3$ and the fluoronitrile is $(CF_3)_2$—CF—CN.

5. The electrical insulation system according to claim 1, where the gaseous medium comprises two fluoroketones having 4 to 12 carbons, a fluoronitrile with a vapor pressure greater than 500 mbar and less than 15000 mbar at 0° C. as the additional dielectric gas, and one or more vector gases.

6. The electrical insulation system according to claim 5, where the gaseous medium comprises two fluoroketones having 5 or 6 carbons, a fluoronitrile with a vapor pressure greater than 500 mbar and less than 15000 mbar at 0° C. as the additional dielectric gas, and one or more vector gases.

7. The electrical insulation system according to claim 6, where the two fluoroketones are $(CF_3)_2$—CF—CO—$CF_3$ and $(CF_3)_2$—CF—CO—$CF_2$—$CF_3$, and where the fluoronitrile is $(CF_3)_2$—CF—CN.

8. The electrical insulation system according to claim 1, where the molar fraction of the fluoroketone or fluoroketones and of the additional dielectric gas, other than the fluoroketones, with a vapor pressure greater than 500 mbar and less than 15000 mbar at 0° C. in the gaseous mixture is at least 1% or at least 2% or at least 5% or at least 10% or at least 15%.

9. The electrical insulation system according to claim 1, where the molecular sieve is selected from natural zeolites or synthetic zeolites.

10. The electrical insulation system according to claim 9, where the zeolite has structure A.

11. A method for electrical insulation and/or for quenching electric arcs in high- and medium-voltage electrical switchgear, the method comprising introducing the electrical insulation system according to claim 1 in a leak-tight complete enclosure in which the elements of the medium- or high-voltage electrical switchgear to be insulated are located.

12. A medium- or high-voltage electrical switchgear comprising a complete enclosure in which there are arranged live electrical components and an electrical insulation system according to claim 1.

13. The medium- or high-voltage electrical switchgear according to claim 12, where the medium- or high-voltage electrical switchgear can be electric power distribution switchgear in grids of up to 72 kV.

* * * * *